(12) United States Patent
Hoyer et al.

(10) Patent No.: US 10,443,463 B2
(45) Date of Patent: Oct. 15, 2019

(54) CATALYST SYSTEM FOR REDUCING NITROGEN OXIDES

(71) Applicant: UMICORE AG & CO. KG, Hanau-Wolfgang (DE)

(72) Inventors: Ruediger Hoyer, Alzenau-Hoerstein (DE); Thomas Utschig, Frankfurt am Main (DE); Michael Schiffer, Hanau (DE); Michael Seyler, Mainaschaff (DE); Frank-Walter Schuetze, Haibach (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 15/328,658

(22) PCT Filed: Aug. 12, 2015

(86) PCT No.: PCT/EP2015/068507
§ 371 (c)(1),
(2) Date: Jan. 24, 2017

(87) PCT Pub. No.: WO2016/023928
PCT Pub. Date: Feb. 18, 2016

(65) Prior Publication Data
US 2017/0218809 A1 Aug. 3, 2017

(30) Foreign Application Priority Data

Aug. 13, 2014 (EP) .................................... 14180742

(51) Int. Cl.
*F01N 3/08* (2006.01)
*B01J 23/44* (2006.01)
*B01J 35/00* (2006.01)
*B01J 23/63* (2006.01)
*B01D 53/94* (2006.01)
*B01J 29/76* (2006.01)
*F01N 3/20* (2006.01)
*B01J 37/02* (2006.01)
*B01J 35/04* (2006.01)
*B01J 23/02* (2006.01)
*B01J 23/10* (2006.01)
*B01J 23/46* (2006.01)
(Continued)

(52) U.S. Cl.
CPC ....... *F01N 3/0814* (2013.01); *B01D 53/9418* (2013.01); *B01D 53/9422* (2013.01); *B01D 53/9477* (2013.01); *B01J 23/02* (2013.01); *B01J 23/10* (2013.01); *B01J 23/44* (2013.01); *B01J 23/464* (2013.01); *B01J 23/63* (2013.01); *B01J 29/763* (2013.01); *B01J 35/0006* (2013.01); *B01J 35/04* (2013.01); *B01J 37/0244* (2013.01); *B01J 37/0246* (2013.01); *F01N 3/0842* (2013.01); *F01N 3/2066* (2013.01); *B01D 2255/1021* (2013.01); *B01D 2255/1023* (2013.01); *B01D 2255/202* (2013.01); *B01D 2255/204* (2013.01); *B01D 2255/2042* (2013.01); *B01D 2255/2047* (2013.01); *B01D 2255/2065* (2013.01); *B01D 2255/20738* (2013.01); *B01D 2255/20746* (2013.01); *B01D 2255/20761* (2013.01); *B01D 2255/50* (2013.01); *B01D 2255/9022* (2013.01); *B01D 2255/91* (2013.01); *B01D 2258/012* (2013.01); *F01N 3/281* (2013.01); *F01N 3/2828* (2013.01); *F01N 13/009* (2014.06); *F01N 2330/06* (2013.01); *F01N 2370/02* (2013.01); *F01N 2510/063* (2013.01); *Y02A 50/2325* (2018.01); *Y02T 10/24* (2013.01)

(58) Field of Classification Search
None
See application file for complete search history.

(56) References Cited

U.S. PATENT DOCUMENTS

| 6,176,079 | B1 | 1/2001 | Konrad et al. |
| 6,709,644 | B2 | 3/2004 | Zones et al. |
| 7,332,135 | B2 | 2/2008 | Gandhi et al. |

(Continued)

FOREIGN PATENT DOCUMENTS

| CA | 2534806 | * | 2/2005 |
| DE | 10011612 A1 | | 10/2000 |

(Continued)

OTHER PUBLICATIONS

International Search Report for PCT/EP2015/068507, dated Nov. 26, 2015 in English and German Language.
(Continued)

*Primary Examiner* — Sheng H Davis
(74) *Attorney, Agent, or Firm* — Smith, Gambrell & Russell, LLP

(57) ABSTRACT

The invention relates to a catalyst system for reducing nitrogen oxides, which comprises a nitrogen oxide storage catalyst and an SCR catalyst, wherein the nitrogen oxide storage catalyst consists of at least two catalytically active washcoat layers on a supporting body, wherein a lower washcoat layer A contains cerium oxide, an alkaline earth compound and/or alkali compound, as well as platinum and palladium, and an upper washcoat layer B, which is arranged over the washcoat layer A, contains cerium oxide, platinum and palladium, and no alkali compound and no alkaline earth compound. The invention also relates to a method for converting NOx in exhaust gases of motor vehicles that are operated by means of engines that are operated in a lean manner.

14 Claims, 1 Drawing Sheet

(51) Int. Cl.
*F01N 3/28* (2006.01)
*F01N 13/00* (2010.01)

(56) References Cited

U.S. PATENT DOCUMENTS

| | | | |
|---|---|---|---|
| 8,617,474 B2 | 12/2013 | Bull et al. | |
| 8,741,799 B2* | 6/2014 | Matsueda | B01D 53/945 |
| | | | 502/170 |
| 2003/0069449 A1 | 4/2003 | Zones et al. | |
| 2009/0285737 A1 | 11/2009 | Bull et al. | |
| 2009/0320457 A1 | 12/2009 | Wan | |
| 2011/0300028 A1 | 12/2011 | Bull et al. | |
| 2011/0305612 A1* | 12/2011 | Muller-Stach | B01D 53/945 |
| | | | 423/212 |
| 2013/0156668 A1* | 6/2013 | Spurk | B01D 53/9418 |
| | | | 423/213.2 |
| 2014/0047819 A1 | 2/2014 | Wan et al. | |
| 2015/0266014 A1* | 9/2015 | Xue | B01J 35/0006 |
| | | | 423/213.5 |

FOREIGN PATENT DOCUMENTS

| | | | |
|---|---|---|---|
| EP | 0885650 | A2 | 12/1998 |
| EP | 0957242 | A2 | 11/1999 |
| EP | 1027919 | A2 | 8/2000 |
| EP | 2698193 | A1 | 2/2014 |
| EP | 2117707 | B1 | 4/2015 |
| WO | 2004/076829 | A1 | 9/2004 |
| WO | 2005/047663 | A2 | 5/2005 |
| WO | 2008/132452 | A2 | 11/2008 |
| WO | 2010137658 | * | 2/2010 |
| WO | 2010/114873 | A2 | 10/2010 |
| WO | 2011/154913 | A1 | 12/2011 |
| WO | 2012/029050 | A1 | 3/2012 |
| WO | 2013/151557 | A1 | 10/2013 |

OTHER PUBLICATIONS

SAE Technical Paper Series 950809, Feb. 27-Mar. 2, 1995, pp. 121-130. Development of New Concept Three-Way Catalyst for Automotive Lean-Burn Engines. N. Miyoshi, et al.

Written Opinion of the Internationals Searching Authority dated Nov. 26, 2015 for PCT/EP2015/068507 (13 pages—German with English machine translation).

International Preliminary Report on Patentability dated Feb. 14, 2017 for PCT/EP2015/068507 (15 pages—German with English machine translation).

* cited by examiner

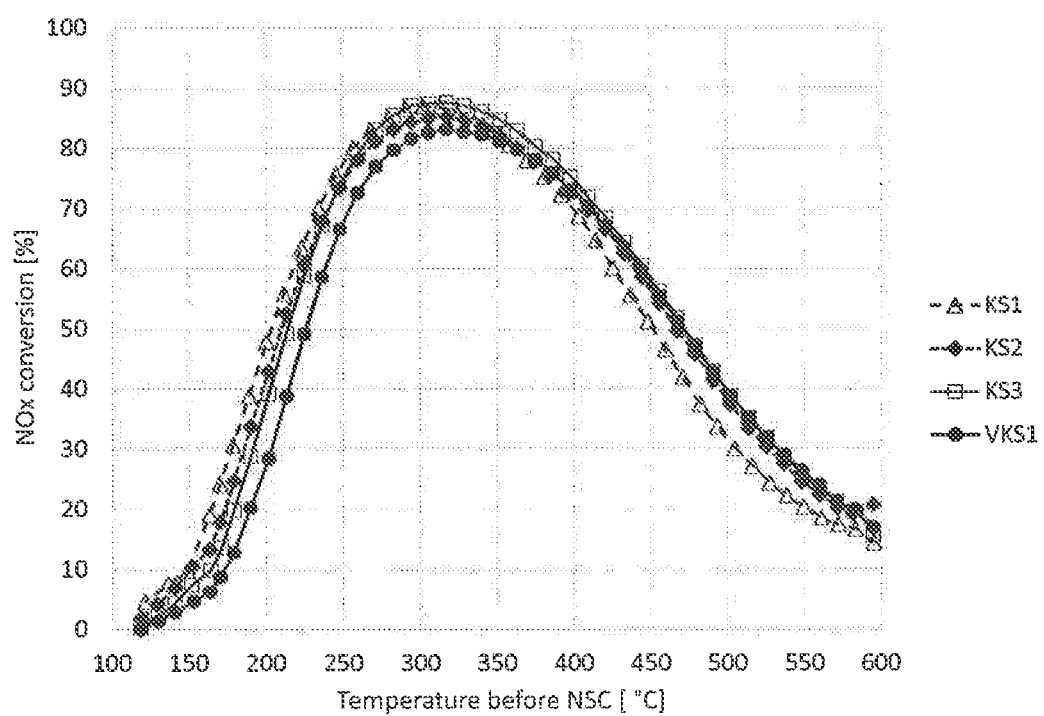

CATALYST SYSTEM FOR REDUCING NITROGEN OXIDES

The invention relates to a catalyst system for reducing nitrogen oxides which are contained in the exhaust gas of combustion engines that are operated in a lean manner.

As well as containing particle emissions, exhaust gases from motor vehicles with a predominantly lean-operating combustion engine contain, in particular, the primary emissions carbon monoxide CO, hydrocarbons HC, and nitrogen oxides NOx. Due to the relatively high oxygen content of up to 15 vol %, carbon monoxide and hydrocarbons may easily be rendered harmless by means of oxidation; however, reducing nitrogen oxides to nitrogen is much more difficult.

It is known that nitrogen oxides from exhaust gases may be rendered harmless in the presence of oxygen by means of nitrogen oxide storage catalysts, for which the terms "Lean NOx Trap" or LNT are also common. Their cleaning action is based upon the fact that in a lean-operating phase of the engine, the nitrogen oxides are predominantly stored in the form of nitrates by the storage material of the storage catalyst and are broken down again in a subsequent rich-operating phase of the engine, and the nitrogen oxides which are thereby released are converted with the reducing exhaust components in the storage catalyst to nitrogen, carbon dioxide, and water. This operating principle is described in, for example, the SAE document SAE 950809.

In particular, oxides, carbonates or hydroxides of magnesium, calcium, strontium, barium, the alkali metals, the rare-earth metals, or mixtures thereof are suitable as storage materials. Due to their basicities, these compounds are able to form nitrates with the acidic nitrogen oxides of the exhaust gas and to store them in this way. They are deposited on suitable carrier materials in as high a dispersion as possible to create a large surface of interaction with the exhaust gas. As a rule, nitrogen oxide storage catalysts also contain precious metals, such as platinum, palladium, and/or rhodium as catalytically active components. Their task is, on the one hand, to oxidize NO to $NO_2$, and CO and HC to $CO_2$ under lean conditions and, on the other hand, to reduce released $NO_2$ to nitrogen during the rich-operating phases, in which the nitrogen oxide storage catalyst is regenerated.

Another known method for removing nitrogen oxides from exhaust gases in the presence of oxygen is the selective catalytic reduction method (SCR process) using ammonia on a suitable catalyst—the SCR catalyst. In this method, the nitrogen oxides to be removed from the exhaust gas are converted to nitrogen and water using ammonia.

The ammonia used as reducing agent may be made available by feeding a compound which decomposes to ammonia, such as, for example, urea, ammonium carbamate, or ammonium formate, into the exhaust gas stream, and by subsequent hydrolysis.

In addition, it is known that ammonia is created as secondary emission in a catalyst upstream of the SCR catalyst during a rich-operating phase of the engine and for it to be stored temporarily in the SCR catalyst during the lean operating phase until the point of consumption. Nitrogen oxide storage catalysts, for example, which are capable of reducing nitrogen oxides, at least partially, not just to the level of the nitrogen, but also to ammonia, may be used to generate ammonia. Catalyst systems which contain an upstream nitrogen oxide storage catalyst and a downstream SCR catalyst are, for example, described in DE 100 11 612 A1, EP 0 957 242 A2, EP 1 027 919 A2, EP 2 698 193 A1, U.S. Pat. No. 7,332,135, WO2004/076829 A1, WO2005/047663 A2, and WO2010/114873 A2.

The nitrogen oxide storage catalysts used in the catalyst system of WO2010/114873 A2 have two layers, wherein the bottom layer lies directly on a flow-through monolith and contains, inter alia, cerium oxide, as well as aluminum oxide, that exhibits cerium oxide and barium oxide. The top layer lies on the bottom layer and also contains cerium oxide, but in a lower quantity than the bottom layer. Both layers also contain the precious metals platinum and palladium; in the top layer, the cerium oxide also carries rhodium.

Dual-layer nitrogen oxide storage catalysts are also described elsewhere. For example, in EP 0 885 650 A2, from which an exhaust gas purifying catalyst for combustion engines with two catalytically active layers on a supporting body is known. The layer located on the supporting body comprises one or more highly dispersed alkaline earth oxides, at least one platinum group metal, and at least one fine-particle oxygen-storing material. The platinum group metals are thereby in close contact with all components of the first layer. The second layer is in direct contact with the exhaust gas and contains at least one platinum group metal, as well as at least one fine-particle oxygen-storing material. Only one part of the fine-particle solids of the second layer serves as a carrier for the platinum group metals. The catalyst is a three-way catalyst which essentially converts the harmful exhaust gas components under stoichiometric conditions, i.e., with the air/fuel ratio λ of 1.

From US2009/320457, a nitrogen oxide storage catalyst is known that comprises two catalyst layers on top of each other on a carrier substrate. The bottom layer lying directly on the carrier substrate comprises one or more precious metals, as well as one or more nitrogen oxide storage components. The top layer comprises one or more precious metals, as well as cerium oxide, and is free of alkali or alkaline earth components.

Catalyst substrates which contain nitrogen oxide storage materials and have two or more layers are also described in WO 2012/029050. The first layer is located directly on the carrier substrate and comprises platinum and/or palladium, while the second layer is located on the first, and comprises platinum. Both layers also contain one or more oxygen-storing materials and one or more nitrogen oxide-storing materials, which comprise one or more alkali and/or alkaline earth metals. The total amount of alkali and alkaline earth metals in the nitrogen oxide-storing materials is 11.04 to 153.37 $kg/m^3$ (0.18 to 2.5 $g/in^3$), calculated as alkaline metal oxide $M_2O$ and alkaline earth oxide MO.

The present invention relates to a catalyst system for reducing nitrogen oxides, which comprises a nitrogen oxide storage catalyst and an SCR catalyst, wherein the SCR catalyst contains a small-pore zeolite with a maximum ring size of eight tetrahedral atoms and a transition metal, and wherein the nitrogen oxide storage catalyst consists of at least two catalytically active washcoat layers A and B on a supporting body, and the washcoat layer A is arranged directly on the supporting body and contains cerium oxide, an alkaline earth compound and/or an alkali compound, as well as platinum and palladium; and the washcoat layer B is arranged over the washcoat layer A and contains cerium oxide, as well as platinum and palladium, and is free of alkali and alkaline earth compounds;

characterized in that the ratio of cerium oxide in washcoat layer B to cerium oxide in washcoat layer A, calculated in $kg/m^3$ (g/L) and in relation to the volume of the supporting body, is 1:2 to 3:1, wherein the sum of cerium oxide in washcoat layer A and washcoat layer B, calculated in kg/m³ (g/L) and in relation to the volume of the supporting body, is 100 to 240 kg/m³ (100 to 240 g/L).

Within the context of the present invention, the term cerium oxide means a commercial grade cerium oxide, i.e., cerium oxide with a cerium oxide share of 90 to 100 wt %.

Therefore, the term also includes dosed cerium oxides. On the other hand, however, within the context of the present invention, the term cerium oxide also means cerium mixed oxides, which have a cerium share of less than 90 wt %—for example, 20 to 90 wt % or 50 to 90 wt %. Advantageously, however, the cerium content is not below 20 wt %.

Examples of cerium mixed oxides, which may be used according to the invention, are, in particular, cerium-zirconium mixed oxides and cerium-aluminum mixed oxides.

In embodiments of the present invention, the ratio of cerium oxide in washcoat layer B to cerium oxide in washcoat layer A, calculated in kg/m³ (g/L) and in relation to the volume of the supporting body, is 1:2 to 2.5:1—in particular, 1:1 to 2:1.

In particular, cerium oxide is used in the washcoat layer B in a quantity of 46 to 180 kg/m³ (from 46 to 180 g/L), preferably from 46 to 90 kg/m³ (from 46 to 90 g/L), and particularly preferably from 46 to 70 kg/m³ (from 46 to 70 g/L), in relation to the volume of the supporting body in each case. In the washcoat layer A, cerium oxide is used in quantities of 14 to 95 kg/m³ (from 14 to 95 g/L), preferably from 25 to 95 kg/m³ (from 25 to 95 g/L), and particularly preferably from 46 to 95 kg/m³ (from 46 to 95 g/L), in relation to the volume of the supporting body in each case.

In further embodiments, cerium oxide is used in the washcoat layer A in a quantity of 25 to 120 kg/m³ (from 25 to 120 g/L), and in washcoat layer B in a quantity of 50 to 180 kg/m³ (from 50 to 180 g/L), in relation to the volume of the supporting body in each case.

The total washcoat loading of the supporting body in embodiments of the present invention amounts to 300 to 600 kg/m³ (300 to 600 g/L), in relation to the volume of the supporting body. In particular, the loading with washcoat layer A amounts to 150 to 500 kg/m³ (150 to 500 g/L), and the loading with washcoat layer B amounts to 50 to 300 kg/m³ (50 to 300 g/L), in relation to the volume of the supporting body in each case.

In further embodiments of the present invention, the loading with washcoat layer A amounts to 250 to 300 kg/m³ (250 to 300 g/L), and with washcoat layer B amounts to 100 to 200 kg/ma (100 to 200 g/L), in relation to the volume of the supporting body in each case.

In embodiments of the present invention, the ratio of platinum to palladium in washcoat layers A and B amounts, for example, to 2:1 to 18:1 or 6:1 to 16:1—for example, 5:1, 8:1, 10:1, 12:1, or 14:1.

In embodiments of the present invention, the sum of platinum and palladium, calculated in kg/m³ (g/L) in each case and in relation to the volume of the supporting body, is the same in washcoat layer A and in washcoat layer B.

In a further embodiment of the present invention, the ratio of the concentrations of platinum and palladium in washcoat layer B to platinum and palladium in washcoat layer A, in relation to the total mass of the respective washcoat layer in each case, calculated in kg/m³ (g/L) and in relation to the volume of the supporting body in each case, is 1:1 to 1:5.

In embodiments of the present invention, washcoat layer A and/or washcoat layer B contain rhodium as additional precious metal. In this case, rhodium is present, in particular, in quantities of 0.003 to 0.35 kg/m³ (from 0.003 to 0.35 g/L), in relation to the volume of the supporting body.

The precious metals platinum and palladium, and, where appropriate, rhodium, are usually present on suitable carrier materials in both washcoat layer A and washcoat layer B. As such, high-surface, high-melting oxides, such as aluminum oxide, silicon dioxide, titanium dioxide, but also mixed oxides such as, for example, aluminum-silicon mixed oxides and cerium-zirconium mixed oxides, are used.

In embodiments of the present invention, aluminum oxide is used as carrier material for the precious metals, especially such aluminum oxide as is stabilized by 1 to 6 wt %—in particular 4 wt %—lanthanum oxide.

It is preferable for the precious metals platinum, palladium, and rhodium to only be supported on one or more of the aforementioned carrier materials, thereby not coming into close contact with all components of the respective washcoat layers. In particular, it is preferred if the precious metals platinum, palladium, and rhodium are supported on cerium oxide and are also not in close contact with cerium oxide.

Suitable as alkaline earth compound in the washcoat layer A are, in particular, oxides, carbonates or hydroxides of magnesium, strontium and barium—particularly, magnesium oxide, barium oxide, and strontium oxide.

Suitable as alkaline earth compound in the washcoat layer A are, in particular, oxides, carbonates, or hydroxides of lithium, potassium, or sodium.

In embodiments of the present invention, the alkaline earth or alkali compound is present in quantities of 10 to 50 kg/m³ (from 10 to 50 g/L), and particularly, 15 to 20 kg/m³ (15 to 20 g/L), calculated as alkaline earth or alkaline oxide.

In further embodiments of the present invention, the alkaline earth or alkali compound present is not supported on cerium oxide.

In a preferred embodiment, the nitrogen oxide storage catalyst contains at least two catalytically active washcoat layers on a supporting body, wherein
  a bottom washcoat layer A contains
    cerium oxide in a quantity of 14 to 95 kg/m³ (from 14 to 95 g/L),
    platinum and palladium in a mass ratio of 8:1 to 10:1, as well as
    magnesium oxide and/or barium oxide; and
  a top washcoat layer B is arranged over the bottom washcoat layer A and contains
    no alkaline earth compound and no alkali compound,
    platinum and palladium in a mass ratio of 8:1 to 10:1, as well as
    cerium oxide in a quantity of 46 to 180 kg/m³ (from 46 to 180 g/L).

It is particularly preferred if, in the specified embodiment, washcoat layer B is present in quantities of 250 to 350 kg/m³ (from 250 to 350 g/L), and washcoat layer A is present in quantities of 80 to 130 kg/m³ (from 80 to 130 g/L), wherein the indication of quantity kg/m³ (g/L) refers to the volume of the supporting body in each case.

In a further preferred embodiment of the present invention, it relates to a catalyst system for reducing nitrogen oxides, which comprises a nitrogen oxide storage catalyst and an SCR catalyst, wherein the nitrogen oxide storage catalyst contains at least two catalytically active washcoat layers on a supporting body, wherein
  a bottom washcoat layer A contains
    cerium oxide in a quantity of 25 to 120 kg/m³ (from 25 to 120 g/L),
    platinum and palladium in a mass ratio of 8:1 to 10:1, as well as
    magnesium oxide and/or barium oxide; and a top washcoat layer B is arranged over the bottom washcoat layer A and contains
no alkaline earth compound and no alkali compound,
platinum and palladium in a mass ratio of 8:1 to 10:1, as well as
cerium oxide in a quantity of 50 to 180 kg/m³ (from 50 to 180 g/L).

In the present invention, SCR catalysts are used that contain a small-pore zeolite with a maximum ring size of eight tetrahedral atoms and a transition metal. Such SCR catalysts are described in, for example, EP 2 117 707 A1 and WO2008/132452.

Particularly preferred zeolites belong to the AEI, CHA, KFI, ERI, LEV, MER, or DDR structure types and are particularly preferably exchanged with cobalt, iron, copper, or mixtures of two or three of these metals.

The term zeolites within the context of the present invention also includes molecular sieves, which are sometimes also referred to as "zeolite-like" compounds. Molecular sieves are preferred, if they belong to one of the aforementioned structure types. Examples include silica aluminum phosphate zeolites, which are known by the term SAPO, and aluminum phosphate zeolites, which are known by the term AlPO.

These too are particularly preferred, when they are exchanged with cobalt, iron, copper, or mixtures of two or three of these metals.

Preferred zeolites or molecular sieves are also those that have an SAR (silica-to-alumina) ratio of 2 to 100—in particular, 5 to 50.

The zeolites or molecular sieves contain transition metal—in particular, in quantities of 1 to 10 wt %, and especially 2 to 5 wt %, calculated as metal oxide, i.e., for example, as $Fe_2O_3$ or CuO.

Preferred embodiments of the present invention contain as SCR catalysts zeolites or molecular sieves of a chabazite type exchanged with copper, iron, or copper and iron.

Appropriate zeolites or molecular sieves are known, for example, by the names SSZ-13, SSZ-62, SAPO-34, or AlPO-34; see U.S. Pat. Nos. 6,709,644 and 8,617,474.

In a particularly preferred embodiment of the present invention, it relates to a catalyst system for reducing nitrogen oxides that comprises a nitrogen oxide storage catalyst and an SCR catalyst, wherein the nitrogen oxide storage catalyst contains at least two catalytically active washcoat layers on a supporting body,
wherein
a bottom washcoat layer A contains
cerium oxide in a quantity of 14 to 95 kg/m³ (from 14 to 95 g/L),
platinum and palladium in a mass ratio of 8:1 to 10:1, as well as
magnesium oxide and/or barium oxide; and
a top washcoat layer B is arranged over the bottom washcoat layer A and contains
no alkaline earth compound and no alkali compound,
platinum and palladium in a mass ratio of 8:1 to 10:1, as well as
cerium oxide in a quantity of 46 to 180 kg/m³ (from 46 to 180 g/L)
and wherein
the SCR catalyst comprises a zeolite or a molecular sieve with a chabazite structure, which contains copper in a quantity of 1 to 10 wt %, calculated as CuO and in relation to the SCR catalyst.

In a further preferred embodiment of the present invention, it relates to a catalyst system for reducing nitrogen oxides that comprises a nitrogen oxide storage catalyst and an SCR catalyst, wherein the nitrogen oxide storage catalyst contains at least two catalytically active washcoat layers on a supporting body,
wherein
a bottom washcoat layer A contains
cerium oxide in a quantity of 25 to 120 kg/m³ (from 25 to 120 g/L),
platinum and palladium in a mass ratio of 8:1 to 10:1, as well as
magnesium oxide and/or barium oxide; and
a top washcoat layer B is arranged over the bottom washcoat layer A and contains
no alkaline earth compound and no alkali compound,
platinum and palladium in a mass ratio of 8:1 to 10:1, as well as
cerium oxide in a quantity of 50 to 180 kg/m³ (from 50 to 180 g/L)
and wherein
the SCR catalyst comprises a zeolite or a molecular sieve with a chabazite structure, which contains copper in a quantity of 1 to 10 wt %, calculated as CuO and in relation to the SCR catalyst.

In the catalyst system of the present invention, the nitrogen oxide storage catalyst consists of at least two catalytically active washcoat layers A and B on a supporting body. The catalytically active washcoat layers A and B are applied to the supporting body in accordance with the customary dip coating methods or pump and suck coating methods with subsequent thermal post-treatment (calcination and reduction using forming gas or hydrogen, if applicable). These methods are sufficiently known from the prior art.

Suitable supporting bodies are, essentially, all known catalytically inert supporting bodies for heterogeneous catalysts. Monolithic and monolith-like flow honeycombs made of ceramic and metal, as well as particle filter substrates, are preferred, as they are commonly used for the cleaning of diesel engine exhaust gases. Ceramic flow honeycombs and ceramic wall flow filter substrates made of cordierite, aluminum titanate, or silicon carbide are particularly preferred.

The SCR catalyst is also preferably applied to a catalytically inert supporting body and, indeed, in accordance with customary dip coating methods or pump and suck coating methods with subsequent thermal post-treatment (calcination and reduction using forming gas or hydrogen, if applicable). Also suitable here as supporting bodies are, essentially, all known catalytically inert supporting bodies for heterogeneous catalysts, wherein monolithic and monolith-like ceramic and metal flow honeycombs, as well as particle filter substrates, as they are conventionally used to purify diesel engine exhaust gases, are preferred. Ceramic flow honeycombs and ceramic wall flow filter substrates made of cordierite, aluminum titanate, or silicon carbide are particularly preferred.

A filter may also be placed between the nitrogen oxide storage catalyst and the SCR catalyst to reduce particle emissions. A filter in this instance is, in particular, a ceramic wall-flow filter substrate made, for example, from cordierite. The filter may also be coated with a catalyst for the conversion of HC/CO. In a preferred embodiment, the filter does not contain an OSC (oxygen storage compound) material.

In the catalyst system according to the invention, nitrogen oxide storage catalysts and SCR catalysts may not just be applied to two separate catalytically inert supporting bodies. They may also be applied jointly to a single catalytically inert supporting body. In this case, the nitrogen oxide storage catalyst is, for example, coated starting from one end of the supporting body over less than its total length, while the SCR catalyst is coated starting from the other end of the supporting body, also over less than its total length.

In embodiments of the present invention, the length E of the catalytically active zone, which comprises the nitrogen oxide storage catalyst, makes up 20 to 70%, 40 to 60%, or 45 to 50% of the total length L of the supporting body. The length Z of the catalytically active zone, which comprises the SCR catalyst, makes up 20 to 70%, 40 to 60%, or 45 to 50% of the total length L of the supporting body in embodiments of the present invention. In preferred embodiments, the lengths E and Z both make up 50% of the total length L.

The sum of the length E of the first catalytically active zone and of the length Z of the second catalytically active zone may correspond exactly to the total length L. Particularly for production reasons, however, it may be smaller than the total length L in embodiments of the present invention. In these cases, a specific length of the total length L is uncoated between the coated lengths E and Z. For example, the sum of the length E of the first catalytically active zone and of the length Z of the second catalytically active zone is L×0.8 to L×0.999.

When the catalyst system according to the invention is used for the intended purpose, the exhaust gas must first flow through the nitrogen oxide storage catalyst, and subsequently through the SCR catalyst. On this basis, it is perfectly suitable for converting $NO_x$ in the exhaust gases of motor vehicles that are operated by means of engines that are operated in a lean manner—for instance, diesel engines. It achieves a good NOx conversion at temperatures of approx. 200 to 450° C., without being negatively influenced at high temperatures. The catalyst system according to the invention is, therefore, suitable for Euro 6 applications.

The present invention also relates to a method for converting $NO_x$ in exhaust gases of motor vehicles that are operated by means of engines that are operated in a lean manner, e.g., diesel engines, characterized in that the exhaust gas is fed over a catalyst system for reducing nitrogen oxides, which comprises a nitrogen oxide storage catalyst and an SCR catalyst, wherein the SCR catalyst contains a small-pore zeolite with a maximum ring size of eight tetrahedral atoms and a transition metal, and the nitrogen oxide storage catalyst consists of at least two catalytically active washcoat layers A and B on a supporting body, and the washcoat layer A is arranged directly on the supporting body and contains cerium oxide, an alkaline earth compound, and/or an alkali compound, as well as platinum and palladium; and the washcoat layer B is arranged over the washcoat layer A and contains cerium oxide, as well as platinum and palladium, and is free of alkali and alkaline earth compounds;

characterized in that the ratio of cerium oxide in washcoat layer B to cerium oxide in washcoat layer A, calculated in $kg/m^3$ (g/L) and in relation to the volume of the supporting body, is 1:2 to 3:1, wherein the sum of cerium oxide in washcoat layer A and washcoat layer B, calculated in $kg/m^3$ (g/L) and in relation to the volume of the supporting body, is 100 to 240 $kg/m^3$ (100 to 240 g/L); and wherein the exhaust gas is fed through the catalyst system such that it first flows through the nitrogen oxide storage catalyst and subsequently through the SCR catalyst.

The exhaust gas is periodically set to lambda<1 (rich exhaust gas) to regenerate the nitrogen oxide storage catalyst and to form ammonia, which converts nitrogen oxides to nitrogen under lean exhaust gas conditions in the subsequent phase. The change to lambda<1 may take place inside the engine by means, for example, of the after-injection of fuel, but also by means of injecting reducing agent directly upstream of the nitrogen oxide storage catalyst.

Embodiments of the method according to the invention with respect to the catalyst system, including the nitrogen oxide storage catalyst and the SCR catalyst, correspond to the aforementioned descriptions.

The invention is explained in more detail in the following examples and figures.

FIG. 1: NOx conversion of the catalyst systems KS1, KS2, KS3, and VKS1 as a function of the temperature.

EXAMPLE 1 a) To produce a catalyst system according to the invention, a ceramic carrier with a honeycomb structure is coated with a first washcoat layer A, which contains Pt and Pd supported on a lanthanum-stabilized alumina, cerium oxide in a quantity of 47 $kg/m^3$ (47 g/L), as well as 17 $kg/m^3$ (17 g/L) barium oxide and 15 $kg/m^3$ (15 g/L) magnesium oxide. Neither barium oxide nor magnesium oxide are supported on the cerium oxide. In the process, the loading of Pt and Pd amounts to 1.77 $kg/m^3$ (1.77 g/L) or 0.177 $kg/m^3$ (0.177 g/L), and the total loading of the washcoat layer amounts to 181 $kg/m^3$ (181 g/L) in relation to the volume of the ceramic carrier.

b) An additional washcoat layer B, which contains Pt, Pd, and Rh supported on a lanthanum-stabilized alumina, is applied to the first washcoat layer. The loading of Pt, Pd, and Rh in this washcoat layer amounts to 1.77 $kg/m^3$ (1.77 g/L), 0.177 $kg/m^3$ (0.177 g/L), and 0.177 $kg/m^3$ (0.177 g/L), respectively. The washcoat layer B also contains 94 $kg/m^3$ (94 g/L) of cerium oxide for a washcoat loading for layer B of 181 $kg/m^3$ (181 g/L).

The catalyst thus obtained is referred to below as SPK1.

c) To produce the SCR catalyst, a ceramic carrier with a honeycomb structure is coated with a zeolite of a chabazite type with an SAR of 28 and exchanged with copper. The washcoat comprises 85 wt % of zeolite, 3 wt % of CuO, and 12 wt % of aluminum oxide. The catalyst thus obtained is referred to below as SCRK1.

d) The catalysts SPK1 and SCRK1 are combined to form a catalyst system, which is referred to as KS1 below.

EXAMPLE 2

The steps a) through d) of example 1 are repeated, with the difference that, in step a), cerium oxide is used in a quantity of 70 $kg/m^3$ (70 g/L), and, in step b), cerium oxide is used in a quantity of 70 $kg/m^3$ (70 g/L).

The catalyst system thus obtained is referred to below as KS2.

EXAMPLE 3

The steps a) through d) of example 1 are repeated, with the difference that, in step a), cerium oxide is used in a quantity of 93 $kg/m^3$ (93 g/L), and, in step b), cerium oxide is used in a quantity of 47 $kg/m^3$ (47 g/L).

The catalyst system thus obtained is referred to below as KS3.

COMPARATIVE EXAMPLE 1

The steps a) through d) of example 1 are repeated, with the difference that, in step a), cerium oxide is used in a quantity of 116 kg/m³ (116 g/L) instead of 47 kg/m³ (47 g/L), and, in step b), cerium oxide is used in a quantity of 24 kg/m³ (24 g/L) instead of 94 kg/m³ (94 g/L).

The catalyst system thus obtained is referred to below as VKS1.

EXAMPLES 4 THROUGH 6

To produce further catalyst systems according to the invention, the nitrogen oxide storage catalysts specified in table 1 below or the SCR catalysts specified in table 2 were manufactured analogously to example 1 a) or b) and combined into the catalyst systems specified in table 3.

TABLE 1

| Catalyst | Cerium oxide washcoat A [kg/m³ (g/L)] | Cerium oxide washcoat B [kg/m³ (g/L)] | Pt:Pd ratio layer A | Pt:Pd ratio layer B |
|---|---|---|---|---|
| SPK4 | 100 | 70 | 10:1 | 2:1 |
| SPK5 | 100 | 100 | 5:1 | 5:1 |
| SPK6 | 70 | 100 | 10:1 | 5:1 |

TABLE 2

| Catalyst | Zeolite | Metal | Metal quantity in wt %, calculated as oxide (CuO or $Fe_2O_3$) |
|---|---|---|---|
| SCRK2 | SAPO-34 | Cu | 2.5 |
| SCRK3 | LEV | Cu | 4.0 |
| SCRK4 | KFI | Fe | 3.5 |

TABLE 3

| Catalyst | Nitrogen oxide storage catalyst | SCR catalyst |
|---|---|---|
| KS4 | SPK4 | SCRK4 |
| KS5 | SPK5 | SCRK2 |
| KS6 | SPK6 | SCRK1 |

Determining the NOx conversion of KS1, KS2, KS3, and VKS1 a) KS1, KS2, KS3, and VKS1 were first aged for 16 h at 800° C. in a hydrothermal atmosphere.

b) The NOx conversion of the catalyst systems KS1, KS2, KS3 according to the invention and of the comparison catalyst system VKS1 as a function of the temperature upstream of the catalyst was determined in a model gas reactor in the so-called NOx conversion test. In this test, synthetic exhaust gas with a nitrogen monoxide concentration of 500 ppm, 10 vol % of carbon dioxide and water respectively, a concentration of 50 ppm of a short-chain hydrocarbon mixture (consisting of 33 ppm of propene and 17 ppm of propane), as well as a residual oxygen content of 7 vol %, is fed over the respective catalyst sample in a model gas reactor at a space velocity of 50 k/h, wherein the gas mixture alternately contains excess oxygen for 80 s ("lean" gas mixture with air/fuel ratio A of 1.47) while nitrogen oxides are stored, and has an oxygen deficit for 10 s to regenerate the catalyst sample ("rich" gas mixture with air/fuel ratio A of 0.92; by adding 5.5 vol % of carbon monoxide with simultaneous reduction of the residual oxygen content to 1 vol %). In so doing, the temperature is reduced from 600° C. to 150° C. by 7.5° C./min, and the conversion over each 90-second-long lean-rich cycle is determined.

The NOx regenerative capacity at 200° C. is important for reproducing driving behavior in urban areas—at 450° C. for highway journeys. In order to meet the Euro 6 exhaust emissions standard, it is particularly important to demonstrate a high NOx regenerative capacity across this entire temperature range.

FIG. 1 shows the NOx conversion of the catalyst systems KS1, KS2, KS3 according to the invention and of the comparison system VKS1 determined in this way.

It follows that the NOx conversion of the comparison catalyst system VKS1 at temperatures up to approx. 350° C. is considerably poorer than the catalyst systems KS1 through KS3 according to the invention. Therefore, for example, the NOx conversion of VKS1 at 250° C. is approx. 67%, while it is approx. 75% for KS1 through KS3.

The invention claimed is:

1. A catalyst system for reducing nitrogen oxides, comprising
   a nitrogen oxide storage catalyst and an SCR catalyst, wherein
   the SCR catalyst contains a small-pore zeolite with a maximum ring size of eight tetrahedral atoms and a transition metal,
   the nitrogen oxide storage catalyst comprises at least two catalytically active washcoat layers A and B on a supporting body,
   the washcoat layer A is arranged directly on the supporting body and comprises cerium oxide, an alkaline earth compound and/or an alkali compound, as well as platinum and palladium,
   the washcoat layer B is arranged over the washcoat layer A and comprises cerium oxide, as well as platinum and palladium, and is free of alkali and alkaline earth compounds,
   a ratio of cerium oxide in washcoat layer B to cerium oxide in washcoat layer A, calculated in kg/m³ (g/L) and in relation to the volume of the supporting body, is 1:2 to 3:1, and
   the sum of cerium oxide in washcoat layer A and washcoat layer B, calculated in kg/m³ (g/L) and in relation to the volume of the supporting body, is 100 to 240 kg/m³ (100 to 240 g/L), and
   wherein a ratio of platinum to palladium in each of the washcoat layers A and B is 2:1 to 18:1.

2. The catalyst system according to claim 1, wherein the washcoat layer B comprises cerium oxide in a quantity of 46 to 180 kg/m³ (from 46 to 180 g/L).

3. The catalyst system according to claim 1, wherein the washcoat layer A comprises cerium oxide in a quantity of 14 to 95 kg/m³ (from 14 to 95 g/L).

4. The catalyst system according to claim 1, wherein the total washcoat loading of the supporting body is 300 to 600 kg/m³ (300 to 600 g/L), in relation to the volume of the supporting body.

5. The catalyst system according to claim 4, wherein the loading of washcoat layer A amounts to 150 to 500 kg/m³ (150 to 500 g/L), and the loading of washcoat layer B amounts to 50 to 300 kg/m³ (50 to 300 g/L), in relation to the volume of the supporting body in each case.

6. The catalyst system according to claim 4, wherein the loading of washcoat layer A amounts to 250 to 300 kg/m³ (250 to 300 g/L), and, the loading of washcoat layer B amounts to 100 to 200 kg/m³ (100 to 200 g/L), in relation to the volume of the supporting body in each case.

7. The catalyst system according to claim 1, wherein the alkaline earth compound in washcoat layer A comprises magnesium oxide, barium oxide, and/or strontium oxide.

8. The catalyst system according to claim 1, wherein the SCR catalyst comprises a zeolite that belongs to the AEI, CHA, KFI, ERI, LEV, MER, or DDR structure type and that is exchanged with cobalt, iron, copper, or mixtures thereof.

9. The catalyst system according to claim 1, wherein the SCR catalyst comprises a zeolite of a chabazite type that is exchanged with copper, iron, or copper and iron.

10. The catalyst system according to claim 1, wherein the nitrogen oxide storage catalyst and the SCR catalyst are arranged on different supporting bodies.

11. A catalyst system for reducing nitrogen oxides, comprising
a nitrogen oxide storage catalyst and an SCR catalyst, wherein
the SCR catalyst contains a small-pore zeolite with a maximum ring size of eight tetrahedral atoms and a transition metal,
the nitrogen oxide storage catalyst comprises at least two catalytically active washcoat layers A and B on a supporting body,
the washcoat layer A is arranged directly on the supporting body and comprises cerium oxide, an alkaline earth compound and/or an alkali compound, as well as platinum and palladium,
the washcoat layer B is arranged over the washcoat layer A and comprises cerium oxide, as well as platinum and palladium, and is free of alkali and alkaline earth compounds,
a ratio of cerium oxide in washcoat layer B to cerium oxide in washcoat layer A, calculated in $kg/m^3$ (g/L) and in relation to the volume of the supporting body, is 1:2 to 3:1, and the sum of cerium oxide in washcoat layer A and washcoat layer B, calculated in $kg/m^3$ (g/L) and in relation to the volume of the supporting body, is 100 to 240 $kg/m^3$ (100 to 240 g/L), and wherein
the washcoat layer A comprises
cerium oxide in a quantity of 14 to 95 $kg/m^3$ (from 14 to 95 g/L),
platinum and palladium in a mass ratio of 8:1 to 10:1, and
magnesium oxide and/or barium oxide;
the washcoat layer B comprises
platinum and palladium in a mass ratio of 8:1 to 10:1, and
cerium oxide in a quantity of 46 to 180 $kg/m^3$ (from 46 to 180 g/L); and
the SCR catalyst comprises a zeolite or a molecular sieve with a chabazite structure, the zeolite or molecular sieve containing copper in a quantity of 1 to 10 wt %, calculated as CuO and in relation to the SCR catalyst.

12. A catalyst system for reducing nitrogen oxides, comprising
a nitrogen oxide storage catalyst and an SCR catalyst, wherein
the SCR catalyst contains a small-pore zeolite with a maximum ring size of eight tetrahedral atoms and a transition metal,
the nitrogen oxide storage catalyst comprises at least two catalytically active washcoat layers A and B on a supporting body,
the washcoat layer A is arranged directly on the supporting body and comprises cerium oxide, an alkaline earth compound and/or an alkali compound, as well as platinum and palladium,
the washcoat layer B arranged over the washcoat layer A and comprises cerium oxide, as well as platinum and palladium and is free of alkali and alkaline earth compounds,
a ratio of cerium oxide in washcoat layer B to cerium oxide in washcoat layer A, calculated in $kg/m^3$ (g/L) and in relation to the volume of the supporting body, is 1:2 to 3:1, and the sum of cerium oxide in washcoat layer A and washcoat layer B, calculated in $kg/m^3$ (g/l) and in relation to the volume of the supporting body, is 100 to 240 $kg/m^3$ (100 to 240 g/L), and, wherein
the washcoat layer A comprises
cerium oxide in a quantity of 25 to 120 $kg/m^3$ (from 25 to 120 g/L),
platinum and palladium in a mass ratio of 8:1 to 10:1, and
magnesium oxide and/or barium oxide;
the washcoat layer B comprises
platinum and palladium in a mass ratio of 8:1 to 10:1, as well as and
cerium oxide in a quantity of 50 to 180 $kg/m^3$ (from 50 to 180 g/L); and
the SCR catalyst comprises a zeolite or a molecular sieve with a chabazite structure, the zeolite or molecular sieve containing copper in a quantity of 1 to 10 wt %, calculated as CuO and in relation to the SCR catalyst.

13. A method for converting $NO_x$ in an exhaust gas of a motor vehicle that operates an engine in a lean manner, comprising
feeding the exhaust gas over a catalyst system according to claim 1.

14. The catalyst system according to claim 1, wherein the nitrogen oxide storage catalyst and the SCR catalyst are arranged on the same supporting body.

* * * * *